Figure 1:
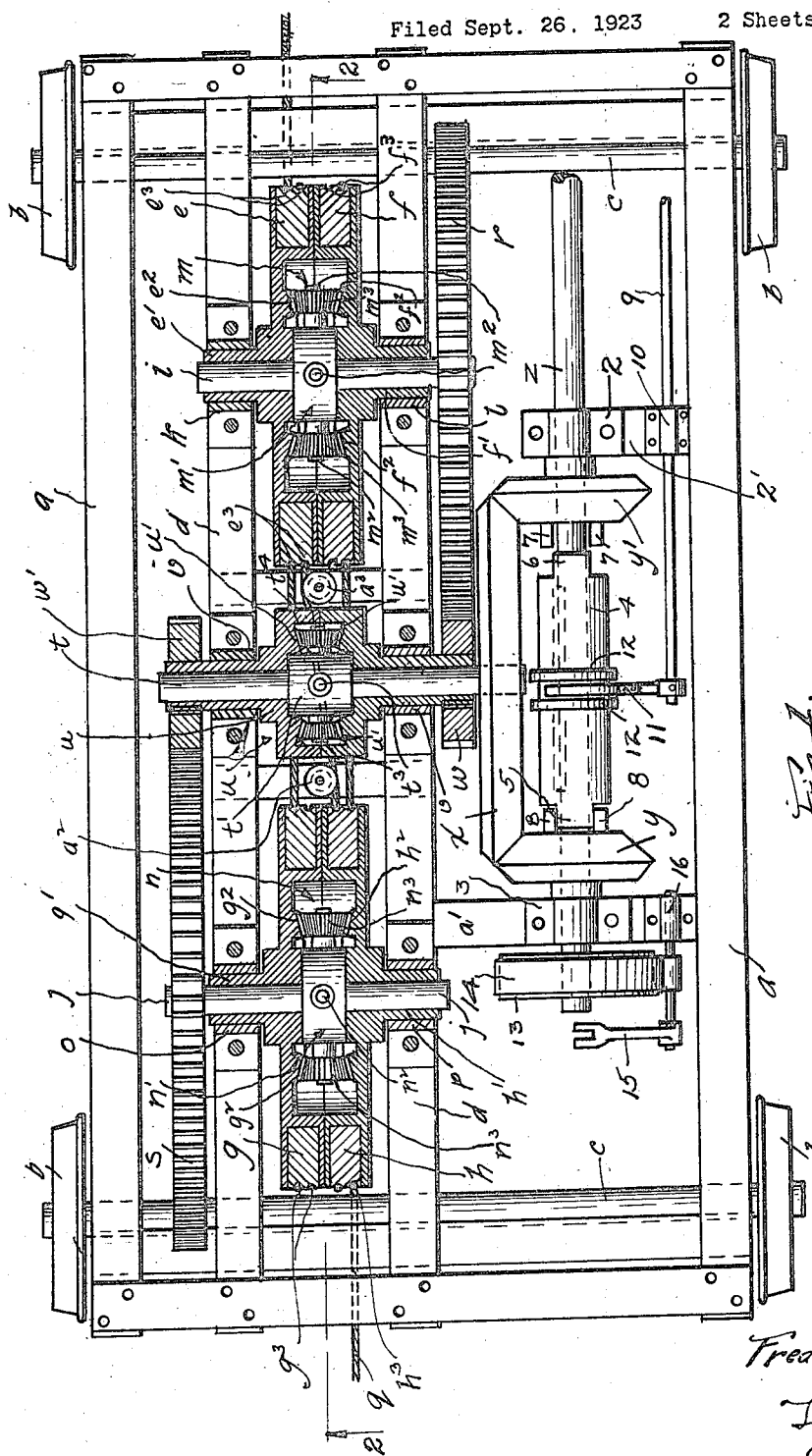

March 4, 1924. 1,485,653
F. C. WALTERS
CABLE CAR TRANSMISSION
Filed Sept. 26, 1923  2 Sheets-Sheet 2

Inventor
Frederick C. Walters

Attorney

Patented Mar. 4, 1924.

1,485,653

UNITED STATES PATENT OFFICE.

FREDERICK C. WALTERS, OF EUGENE, OREGON.

CABLE-CAR TRANSMISSION.

Application filed September 26, 1923. Serial No. 664,934.

*To all whom it may concern:*

Be it known that I, FREDERICK C. WALTERS, a citizen of the United States, and a resident of Eugene, county of Lane, and State of Oregon, have invented a certain new and useful Improvement in Cable-Car Transmission, of which the following is a specification.

My invention relates to cable mechanism and especially to cable cars which are self propelling being provided with a number of drums over which the cable is wound; and the drums being operatively connected, and driven from a common source of power. All of these drums are in contact with a continuous cable, and thus if any of the drums are reduced in diameters by wear, strains will be set up between the operating drums which may cause the cable to break or to slip on the face of the larger drum or drums.

In order that the cable has a firm grip on the drums they are usually made with a circumferential surface of relatively soft material, and thus the constrictive force of the cables about the drums causes the strands of the cables to form grooves in the surface of the drums. These grooved surfaces gradually form seats for the cable, and as the strands of the cable are substantially uniform throughout the length of the cable, the continued use will cause these seats to become more pronounced and thus more effective. If any slippage occurs, however, the cable will cut these seats away, and leave the surface of the drums smooth, thus materially decreasing the frictional hold of the cable.

The object of my invention, therefore, is to provide in the operative connection of the drums with the driving power, differential mechanism, which will equalize the strain between the driving drums of the cable-car, so that all of the drums will transmit equal power to the cable, but will not set up differential strains in the cable, tending to cause the cable to break or slip on the drums, and in that way render the devices relatively ineffective.

I attain my objects in mechanism which in a general way may be said to comprise a cable car transmission of the character described, three parallel shafts, means for driving one of the shafts, a divided member rotatably mounted on the middle shaft, and a divided drum mounted on each of the other shafts, said member and said drums consisting each of two equal sized, abutting sections of substantial width and independently rotatable, and each section being made with a hollow stub shaft, pinions fast on the ends of the hollow stub shafts on said member mounted on the middle shaft, gears fast on the other meshing with said pinions, each of said sections being formed with interior companion recesses, the opposed faces of which are respectively provided with a ring-gear, a spider fast on each of said shafts within said recesses and gears journaled on said spider, said gears being in mesh with said ring-gears.

Figure 2:
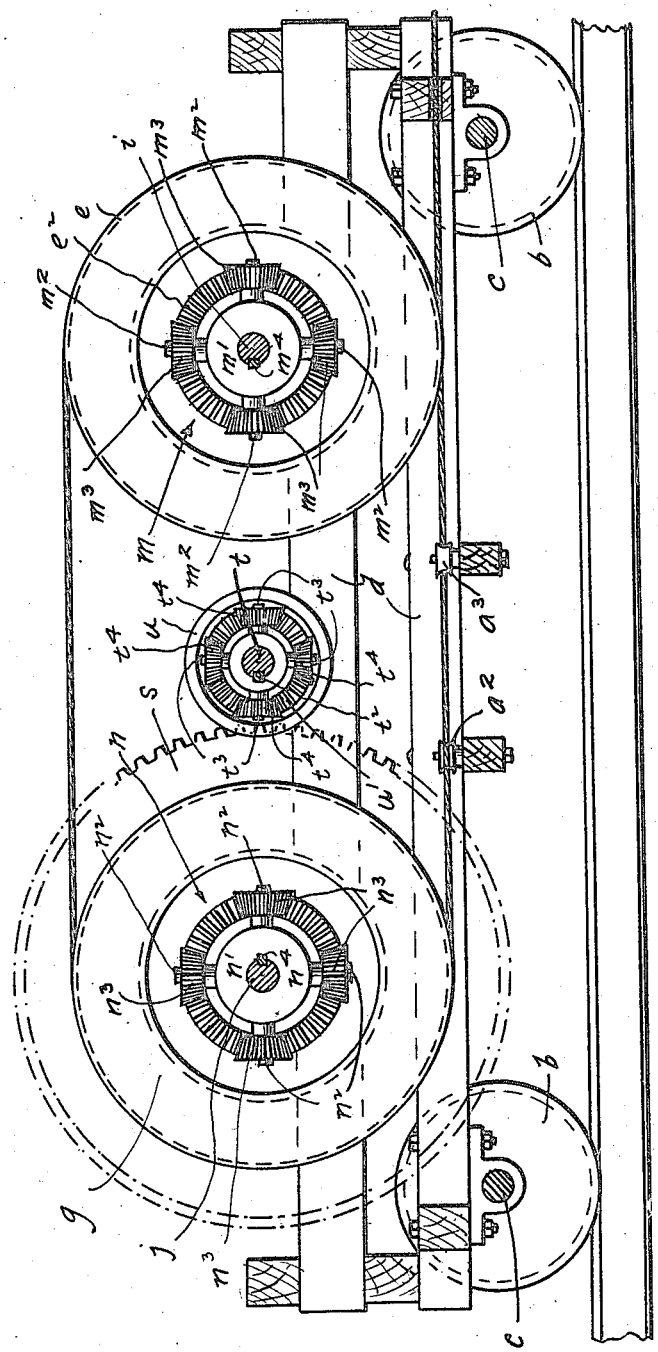

The operation and construction of my transmission is hereinafter described and illustrated in the accompanying drawings, in which:

Fig. 1 is a plan view of a cable car embodying my invention and shows the differential mechanism in section, so as better to illustrate the working parts; and Fig. 2 is a vertical section taken on the line 2—2 of Fig. 1.

The cable car embodying my invention is made with a frame $a$ supported by flanged wheels $b$, which are mounted on axles $c$. I provide longitudinal supporting members $d$ which are located slightly to one side of the longitudinal middle of the frame and between which the cable drums are mounted. I provide four cable drums which are arranged in sets, two drums in a set and the drums in each set being located side by side, the drums $e$ and $f$ being in one set and the drums $g$ and $h$ being in the other set. The drums $e$ and $f$ are rotatably mounted on the transverse axle $i$ and the drums $g$ and $h$ are rotatably mounted on the transverse axle $j$. The drums $e$ and $f$ are provided with extended hubs $e'$ and $f'$ and the drums $g$ and $h$ with similar hubs $g'$ and $h'$. The hub $e'$ is journaled in boxing $k$ mounted on one of the longitudinal supporting members $d$ and the hub $f'$ in similar boxing $k'$ on the other longitudinal supporting member. The drums $e$ and $f$ are made with hollowed portions which enclose the differential mechanism $m$. The drums $g$ and $h$ are similarly constructed so as to enclose their differential mechanism $n$. The drums $g$ and $h$ are also provided with extended hubs $g'$ and $h'$ respectively. The differential mechanism is made up with a spider $m'$ which has four projecting arms $m^2$. Spider gears $m^3$ are provided at the end of each projecting arm and these spider gears mesh with ring gear $e^2$ on the drum $e$, and $f^2$ on the drum $f$. The spider $m'$ is fastened to the shaft $i$ by means of a key $m^4$. The differential mechanism $n$ is similarly constructed being made with a spider $n'$ with four projecting arms $n^2$, at the end of each there being a spider gear $n^3$ which meshes at each side with the ring gears $g^2$ on the drum $g$ and $h^2$ on the drum $h$. The spider $n'$ being fastened to the shaft $j$ by means of a key $n^4$.

The drums $e$, $f$, $g$ and $h$ are each provided with grooves $e^3$, $f^3$, $g^3$ and $h^3$ which are preferably semi-circular and are each adapted to receive one turn of the cable $q$. This cable is a continuous cable and passes first under the drum $h$ and around the drum $f$ over the same and back over the drum $h$ thence under the drum $e$, being guided thereto by sheaves $a^2$ and $a^3$ around and over the same and over the drum $g$ and from there under the drum $e$. Thus, it is in contact with each of the drums for approximately one-half their circumference. A gear $r$ is keyed to the shaft $i$ and a gear $s$ is keyed to the shaft $j$. The shaft $t$ is mounted transversely across the longitudinal members $d$ and is journaled in the split central differential housing $u$. This differential housing is made in halves and each half is journaled in boxings $v$ mounted on the longitudinal members $d$. Pinions $w$ and $w'$ are mounted at the outer ends of each section of the split differential housing $u$ and are attached by keys so as to rotate therewith. The pinion $w'$ meshes with the gear $s$ and the pinion $w$ meshes with the rear $r$. A differential spider $t'$ is mounted on the shaft $t$ and is fastened thereto by means of a key $t^2$. The spider is made with four projecting arms $t^3$ at the end of each of which are mounted spider gears $t^4$. The split differential casing is cut away so as to enclose the spider and the spider gears, and each section of the differential housing is provided with ring gears $u'$ which mesh with the spider gears $t^4$. On one end of the shaft $t$ is a driving gear $x$. The gear $x$ is a beveled gear and meshes on the opposite side with driving pinions $y$ and $y'$. These beveled pinions $y$ and $y'$ are journaled on the driving shaft $z$ but are held against relative lineal movement by bearings 2 and 3. The bearing 3 is supported by a transverse member $a$ which is supported by a frame $a$ on one side and one of the longitudinal bracing members $d$ on the other. The bearing 2 is supported by a transverse member $2'$ which is supported at one end by the frame $a$. A sliding clutch member 4 is mounted on the shaft $z$ and rotates therewith but has relative lineal movement thereon. This clutch member is made with clutch faces at each end, as 5 and 6. The pinion $y'$ is provided with a cooperating clutch face 7 and the pinion $y$ is provided with a similar clutch face 8, and thus as the clutch member is moved to its opposite position it engages respectively with the pinion $y'$ or the pinion $y$. The clutch member 4 is controlled by means of a sliding control rod 9 which is supported by the member $2'$ in boxing 10. The controlling rod 9 is provided with a shifting fork 11 which seats between the flanges 12 on the clutch member 4.

I also provide a brake drum 13 which has a contracting brake band 14 mounted on its rim. This band is controlled by an L-shaped brake lever 15 which is pivotally mounted in the box 16 on the transverse member $a'$.

The operation of my device is as follows:

As long as the separate drums $e$, $f$, $g$, $h$ of my device are the same size they will rotate in the same direction at the same rate of speed and will not tend to set up any differential strains in the cable, nor will it tend to slip on any of the drums. In case, however, one of the drums becomes smaller due to wear or other causes, such as imperfection in the material, this drum will for that reason be smaller in circumference and will, therefore, not pass as much cable in one revolution as will the other three and, therefore, a strain will be set up in the cable between this drum and the succeeding drum which will have to be compensated by slippage on the drum or else the cable will break when this strain reaches an undue amount.

My differential mechanism between the drums, therefore, permits any of the drums to rotate at a different rate of speed than any of the remaining drums and therefore, for example, if drum $g$ should become slightly smaller than the remaining drums it would be permitted to rotate at a different speed than the drum $h$ and if there should be any differential strain set up between the two sets of drums $g$ and $h$ and the drums $e$ and $f$ the differential mechanism on shaft $t$ would compensate for this difference due to the differential mechanism thereon, thus each drum serves as a driving medium at all times.

My differential mechanism is preferably made with two ring gears, one on the face of each drum spaced apart and operatively connected by means of the spider gears.

If the cable car on which my mechanism is mounted is being driven up a hill the propelling shaft $c$ will be connected to the engine and will be a driving shaft. It will be connected with the driving gear $x$ through either of the pinions $y$ or $y'$ so as to rotate the mechanism in the desired direction. The rotation of the beveled gear $x$ will cause a similar rotation of the shaft $t$ and therewith it the spider $u$ and if the strain on both halves of the split central differential housing $u$ is equal this housing will rotate in the same direction of rotation and at the same speed and will rotate the pinions *w* and *w'* which will rotate the gears *r* and *s*. If the drums *e, f, g,* and *h* are all of the same size they will be rotated similarly through their respective differential mechanisms *m* and *n*. If, however, one of the drums is of different diameter than the other three it will be permitted to rotate at a different rate of rotation due to the differential mechanism in the manner previously described.

I have discovered that it is necessary to provide four or more driving drums in order to provide sufficient traction between the cable and the drums, to provide sufficient power to propel the car without exceeding the limited space provided for these drums.

It is to be understood that the cable used with this cable car is fastened at each end at the termini of the road bed. I have discovered that it is essential to provide tension devices at each end which have a limited amount of give, or travel; that is, which permit the cable to be paid out a limited amount so that the length of cable can be varied sufficiently to accommodate the variations in the road bed, but which still permit the cable to exercise a uniform tension about the driving drums on the cable car. The devices thus operate to maintain the tension of the cable evenly on the drums even though the car is passing around a curve or is moving over a depression or ascension in the road surface and thus deviating from a straight line between the termini of the road bed.

The illustrations and description above given are merely intended to show a mode of construction of my device. The particular details of construction above described are, however, variable to suit the ideas of the manufacturer, provided such variation contains the essential features of my invention.

I claim:

1. In a cable transmission of the character described comprising parallel shafts, and divided drums mounted thereon, a driving power applied to one of said shafts, operative connections between the intermediate and said outermost shaft, such connection including a divided member and differential devices located within interior recesses provided in the opposed faces of the sections of said divided member and said drums respectively.

2. In a cable transmission of the character described comprising parallel shafts, and divided drums mounted thereon, a driving power applied to one of said shafts, operative connections between the intermediate and said outermost shafts, such connection including a divided member and differential gearing elements located within interior recesses provided in the opposed faces of the sections of said divided member and said drums respectively.

3. In a cable transmission of the character described comprising parallel shafts, and divided drums mounted thereon, a driving power applied to one of said shafts, operative connections between the intermediate and said outermost shafts, such connection including a divided member and differential ring-gears and spur-gears in mesh therewith located within interior recesses provided in the opposed faces of the sections of said divided member and said drums respectively.

4. In a cable transmission of the character described comprising parallel shafts, and divided drums mounted thereon, each drum consisting of two equal sized independent rotatable sections of substantial width, a driving power applied to one of said shafts, operative connection between the intermediate and said outermost shafts, such connection including a divided member and differential devices located within interior recesses provided in the opposed faces of the sections of said divided member and said drums respectively.

5. In a cable transmission of the character described comprising parallel shafts, and divided drums mounted thereon, each drum consisting of two equal sized independent rotatable sections of substantial width, a driving power applied to one of said shafts, operative connections between the intermediate and said outermost shafts, such connections including a divided member and differential ring-gears and spur-gears in mesh therewith located within interior recesses provided in the opposed faces of the sections of said divided member and said drums respectively.

6. In a cable car transmission of the character described, three parallel shafts, means for driving one of the shafts, a divided member rotatably mounted on the middle shaft, and a divided drum mounted on each of the other shafts, each section of said member and said drums being made with a hollow shaft, pinions fast on the ends of the hollow stub shafts on said member mounted on the middle shaft, gears fast on the other shaft meshing with said pinions, each of said sections being formed with interior companion recesses, the opposed faces of which are respectively provided with a ring-gear, a spider fast on each of said shafts within said recesses, and gears journaled on said spider, said gears being in mesh with said ring-gears.

7. In a cable car transmission of the character described, three parallel shafts, means for driving one of the shafts, a divided member rotatably mounted on the middle shaft, and a divided drum mounted on each of the other shafts, said member and said drums consisting each of two equal sized, abutting sections of substantial width and independently rotatable, and each section being made with a hollow stub shaft, pinions fast on the ends of the hollow stub shafts on said member mounted on the middle shaft, gears fast on the other shaft meshing with said pinions, each of said sections being formed with interior companion recesses, the opposed faces of which are respectively provided with a ring-gear, a spider fast on each of said shafts within said recesses and gears journaled on said spider, said gears being in mesh with said ring-gears.

8. In a cable car of the character described, two parallel shafts, and a drum comprising two units mounted side by side on each shaft, the drum units being operatively connected together, said shafts being operatively connected together and the shafts being connected to a common source of power through the medium of said connections, whereby each drum-half constitutes a driving member, said connection including means adapted to permit the drum units to rotate relatively with each other thereby to equalize the strain of the cable between each drum unit around which it is wrapped.

9. In a cable car of the character described, two parallel shafts, and a drum comprising two units mounted side by side on each shaft, the drum units being operatively connected together by differential devices said shafts being operatively connected together, such connection including differential devices and the shafts being connected to a common source of power through the medium of said connection, whereby each drum-half constitutes a driving member and the differential devices tend to equalize the strain of the cable wound around said drum units between the drum units thereof.

10. In a cable car, a plurality of driving drums operatively connected to a common source of power, each drum being adapted to receive a turn of a continuous cable, said drums being provided with wearing peripheries made of a material softer than iron, to cause said cable to form grooves thereon, devices operatively connecting said drums together, such devices adapted to permit a relative movement of the drums to relieve any undue tension set up in the cable tending to drag it over and gouge away the peripheries of the drums.

11. In a cable car, a plurality of drums operatively connected together and to a common source of power, a cable mounted over said drums, said drums being provided with wearing peripheries made of a material softer than iron, to cause said cable to form grooves thereon, differential devices between said drums tending to prevent any relative movement of said cable on their said drum peripheries which would tend to gouge away the grooves thus formed.

12. In a cable car, a plurality of drums operatively connected together and to a common source of power, each drum being adapted to receive a turn of a continuous cable, said drums being provided with wearing peripheries made of a material softer than iron, to cause said cable to form grooves thereon, differential devices between each of said drums tending to prevent any relative movement of said cable on their said drum peripheries which would tend to gouge away the grooves thus formed.

FREDERICK C. WALTERS.